US012166511B2

(12) United States Patent
Liao et al.

(10) Patent No.: US 12,166,511 B2
(45) Date of Patent: Dec. 10, 2024

(54) ANTENNA STRUCTURE AND WIRELESS COMMUNICATION DEVICE USING SAME

(71) Applicants: Futaijing Precision Electronics (Yantai) Co., Ltd., Yantai (CN); FIH (HONG KONG) LIMITED, Kowloon (HK)

(72) Inventors: Chih-Wei Liao, New Taipei (TW); Jia-Ying Xie, New Taipei (TW); Jia-Hung Hsiao, New Taipei (TW)

(73) Assignees: Futaijing Precision Electronics (Yantai) Co., Ltd., Yantai (CN); FIH (HONG KONG) LIMITED, Kowloon (HK)

( * ) Notice: Subject to any disclaimer, the term of this patent is extended or adjusted under 35 U.S.C. 154(b) by 642 days.

(21) Appl. No.: 17/324,646

(22) Filed: May 19, 2021

(65) Prior Publication Data

US 2022/0140846 A1  May 5, 2022

(30) Foreign Application Priority Data

Nov. 4, 2020  (CN) .......................... 202011219315.7

(51) Int. Cl.
*H04B 1/00*  (2006.01)
*H01Q 1/24*  (2006.01)
(Continued)

(52) U.S. Cl.
CPC ........... *H04B 1/0064* (2013.01); *H01Q 1/243* (2013.01); *H01Q 1/48* (2013.01); *H01Q 13/10* (2013.01); *H04B 1/00* (2013.01)

(58) Field of Classification Search
CPC ........ H04B 1/0064; H04B 1/00; H01Q 1/243; H01Q 1/48; H01Q 13/10; H01Q 5/328;
(Continued)

(56) References Cited

U.S. PATENT DOCUMENTS 6,670,924 B1 * 12/2003 Shoji ..................... H01Q 1/243
343/893
10,944,151 B2 * 3/2021 Hsu ........................ H01Q 21/28
(Continued)

FOREIGN PATENT DOCUMENTS

| CN | 110767987 A | 2/2020 |
| CN | 111244616 A | 6/2020 |
| CN | 211350951 U | 8/2020 |

*Primary Examiner* — Hai V Tran
(74) *Attorney, Agent, or Firm* — ScienBiziP, P.C.

(57) ABSTRACT

An antenna structure includes a housing, a first feed source, a second feed source, and a resonance circuit. The housing includes a first and a second radiator spaced to each other and grounded. The first feed source feeds current into the first radiator to activate a first mode, a second mode, and a third mode to generate radiation signals in a first frequency band, a second frequency band, and a third frequency band. The second feed source feeds current into the second radiator to activate a fourth mode to generate radiation signals in a fourth frequency band. The resonance circuit adjusts a radiation frequency band of the second radiator according to an impedance of the resonance circuit. The first radiator adjusts the third mode according to the radiation frequency band of the second radiator. A wireless communication device employing the antenna structure is also provided.

18 Claims, 10 Drawing Sheets

(51) Int. Cl.
*H01Q 1/48* (2006.01)
*H01Q 13/10* (2006.01)

(58) Field of Classification Search
CPC ............ H01Q 21/28; H01Q 1/50; H01Q 5/28;
H01Q 5/314; H01Q 5/50; H01Q 21/00
See application file for complete search history.

(56) References Cited

U.S. PATENT DOCUMENTS

| | | | | |
|---|---|---|---|---|
| 2009/0278755 A1* | 11/2009 | Shoji | .................. | H01Q 5/335 |
| | | | | 343/745 |
| 2012/0056795 A1* | 3/2012 | Nagumo | .................. | H01Q 9/40 |
| | | | | 333/32 |
| 2013/0328742 A1* | 12/2013 | Hirobe | .................. | H01Q 5/335 |
| | | | | 343/853 |
| 2016/0043468 A1* | 2/2016 | Onaka | .................. | H01Q 5/335 |
| | | | | 343/750 |
| 2016/0254590 A1* | 9/2016 | Seo | .................. | H04B 1/006 |
| | | | | 343/876 |
| 2017/0244151 A1* | 8/2017 | Han | .................. | H01Q 21/30 |
| 2017/0244818 A1* | 8/2017 | Kim | .................. | H01Q 5/335 |
| 2018/0026334 A1* | 1/2018 | Chen | .................. | H01Q 5/371 |
| | | | | 343/702 |
| 2018/0026336 A1* | 1/2018 | Chen | .................. | H04Q 1/48 |
| | | | | 343/702 |
| 2018/0026337 A1* | 1/2018 | Chen | .................. | H01Q 1/243 |
| | | | | 343/702 |
| 2018/0026339 A1* | 1/2018 | Chih | .................. | H01Q 5/35 |
| | | | | 343/702 |
| 2018/0026340 A1* | 1/2018 | Chih | .................. | H01Q 5/50 |
| | | | | 343/702 |
| 2018/0026346 A1* | 1/2018 | Lee | .................. | H01Q 5/10 |
| | | | | 455/575.7 |
| 2018/0026350 A1* | 1/2018 | Hung | .................. | H01Q 5/371 |
| | | | | 455/575.7 |
| 2018/0026351 A1* | 1/2018 | Tsai | .................. | H01Q 1/243 |
| | | | | 455/575.7 |
| 2018/0026355 A1* | 1/2018 | Lee | .................. | H01Q 1/243 |
| | | | | 343/770 |
| 2018/0034148 A1* | 2/2018 | Nam | .................. | H01Q 1/50 |
| 2018/0062244 A1* | 3/2018 | Huang | .................. | H01Q 5/371 |
| 2018/0062270 A1* | 3/2018 | Liang | .................. | H01Q 1/243 |
| 2018/0069301 A1* | 3/2018 | Choi | .................. | H01Q 9/42 |
| 2018/0166769 A1* | 6/2018 | Chang | .................. | H01Q 5/335 |
| 2018/0248250 A1* | 8/2018 | Hsu | .................. | H01Q 13/10 |
| 2018/0277929 A1* | 9/2018 | Seo | .................. | H01Q 1/241 |
| 2018/0366812 A1* | 12/2018 | Kim | .................. | H01Q 1/44 |
| 2019/0044218 A1* | 2/2019 | Ye | .................. | H01Q 5/50 |
| 2019/0131722 A1* | 5/2019 | Ryu | .................. | H01Q 25/005 |
| 2019/0181552 A1* | 6/2019 | Lee | .................. | H01Q 3/247 |
| 2019/0181553 A1* | 6/2019 | Lee | .................. | H01Q 5/35 |
| 2019/0190157 A1* | 6/2019 | Chang | .................. | H01Q 9/42 |
| 2019/0348750 A1* | 11/2019 | Lin | .................. | H01Q 9/42 |
| 2019/0372201 A1* | 12/2019 | Zhu | .................. | H04B 5/0075 |
| 2022/0209403 A1* | 6/2022 | Li | .................. | H01Q 1/243 |
| 2023/0070301 A1* | 3/2023 | Xie | .................. | H01Q 5/328 |

* cited by examiner

ANTENNA STRUCTURE AND WIRELESS COMMUNICATION DEVICE USING SAME

FIELD

The subject matter herein generally relates to an antenna structure and a wireless communication device using the antenna structure.

BACKGROUND

Metal housings, for example, metallic backboards, are widely used in wireless communication devices such as mobile phones or personal digital assistants (PDAs). These wireless communication devices need antennas for wireless communication, for receiving and transmitting wireless signals at different frequencies, such as Long Term Evolution Advanced (LTE-A) frequency bands. However, these wireless communication devices and their housings are becoming smaller and smaller due to nowadays technical evolution. Attempting to use a full frequency antenna in housings of smaller and smaller size becomes more and more difficult, especially where other single frequency antennas may require adjustment to a single frequency, which may affect the transmitting and receiving frequencies of the full frequency antenna.

BRIEF DESCRIPTION OF THE DRAWINGS

Implementations of the present technology will now be described, by way of example only, with reference to the attached figures.

DETAILED DESCRIPTION

Figure 1:
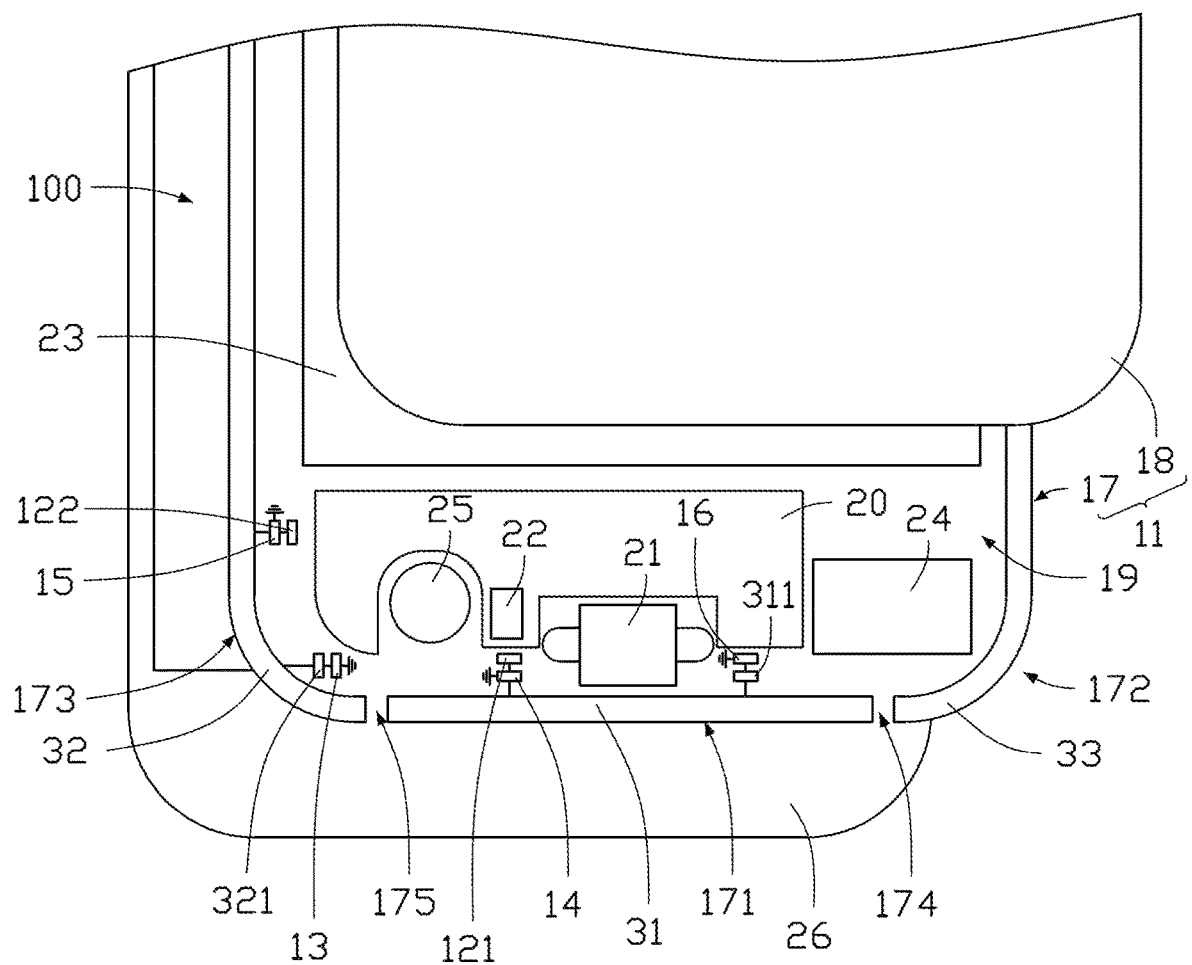
FIG. 1 is an isometric view of an exemplary embodiment of a wireless communication device using an antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an antenna structure and a wireless communication device using same.

FIG. 1 illustrates an embodiment of a wireless communication device 200 using an antenna structure 100. The wireless communication device 200 can be a mobile phone or a personal digital assistant, for example. The antenna structure 100 can receive and/or transmit wireless signals.

The antenna structure 100 includes a housing 11, a resonance circuit 13, a first matching circuit 14, a second matching circuit 15, and a switching circuit 16. The housing 11 can be a housing of the wireless communication device 200. In this exemplary embodiment, the housing 11 includes at least a backboard 18 and a side frame 17. In at least one embodiment, the backboard 18 can be made of non-metal material, such as, but not limited to plastic and glass. The side frame 17 can be made of metal material. The backboard 18 and a side frame 17 cooperatively form the housing of the wireless communication device 200.

The side frame 17 is substantially ring shaped. The side frame 17 defines an opening (not shown in the figures) for receiving a display 26 of the wireless communication device 200. In at least one embodiment, the display 26 has a displaying planar, which is exposed from the opening and parallel to the backboard 18. In at least one embodiment, the side frame 17 surrounds edges of the backboard 18 to cooperatively form a receiving space 19 having the opening. The receiving space 19 can receive a printed circuit board, a processing unit, and other electronic components or modules.

The side frame 17 includes at least an end portion 171, a first side portion 172, and a second side portion 173. The end portion 171 can be an end of the wireless communication device 200. The first side portion 172 is opposed to the second side portion 173, each of the first side portion 172 and the second side portion 173 are arranged at opposing ends of the end portion 171. Preferably, the first side portion 172 and the second side portion 173 are perpendicular to the end portion 171. The end portion 171, the first side portion 172 and the second side portion 173 are perpendicularly connected to the backboard 18.

The side frame 17 defines a port (not shown in the figures), a gap 174, and a slot 175. The port is defined throughout in a middle section of the end portion 171.

The wireless communication device 200 further includes a base board 20 and at least one electronic component. The base board 20 can be a printed circuit board (PCB), which can be made of dielectric material, such as but not limited to fiberglass reinforced (FR4). In at least one embodiment, the wireless communication device 200 includes at least five electronic components, including a first electronic element 21, a second electronic element 22, a third electronic element 23, a fourth electronic element 24, and a fifth electronic element 25. The first electronic element 21 can be a Universal Serial Bus (USB) interface module, which is received in the receiving space 19 and adjacent to and electrically connected to the base board 20. The first electronic element 21 corresponds to the port and is exposed from the port. The first electronic element 21 can electrically connect to an external USB device via the port.

The second electric element 22 can be a microphone and received in the receiving space 19. The second electric element 22 is arranged between the slot 175 and the first electronic element 21. The third electric element 23 can be a battery and received in the receiving space 19. The third electric element 23 is adjacent to the first electronic element 21 and the second electric element 22. The fourth electric element 24 can be a loudspeaker received in the receiving space 19. The fourth electric element 24 is arranged between the base board 20 and the first side portion 172. The fifth electric element 25 can be a vibrator device received in the receiving space 19. The fifth electric element 25 is arranged between the base board 20 and the second side portion 173.

In at least one embodiment, the gap 174 is defined on a section of the side frame 17 between the port and the first side portion 172. The slot 175 is defined on a section of the side frame 17 between the port and the second side portion 173. Thus, the gap 174 and the slot 175 are arranged on each side of the port. In at least one embodiment, the gap 174 and the slot 175 are communicated and extended across the side frame 17. Thus, the side frame 17 is divided into three portions by the gap 174 and the slot 175, that is, a first radiator 31, a second radiator 32, and a coupling portion 33. In detail, a first portion of the side frame 17 between the gap 174 and the slot 175 forms the first radiator 31. A second portion of the side frame 17 adjacent to the gap 174 and the first side portion 172 forms the coupling portion 33. A third portion of the side frame 17 adjacent to the slot 175 and the second side portion 173 forms the second radiator 32. In at least one embodiment, the first radiator 31 and the second radiator 32 are grounded. The first radiator 31 forms a full frequency antenna, and the second radiator 32 forms a single frequency antenna.

In this exemplary embodiment, the slot 175 and the gap 174 are both filled with insulating material, for example, plastic, rubber, glass, wood, ceramic, or the like, thereby isolating the first radiator 31, the second radiator 32, and the coupling portion 33.

The first feed source 121 and the second feed source 122 are arranged in the receiving space 19, thus the first feed source 121 and the second feed source 122 can be electrically connected to the base board 20.

The first feed source 121 is electrically connected to the first radiator 31 through the first matching circuit 14. The first feed source 121 can feed current to the first radiator 31 and activates the first radiator 31 in a first mode, a second mode, and a third mode to generate radiation signals respectively in a first frequency band, a second frequency band, and a third frequency band. In at least one embodiment, a part of the current may flow along the first radiator 31 and be coupled to the coupling portion 33 through the gap 174, thus, the first feed source 121, the first radiator 31, and the coupling portion 33 form a coupling feed antenna and activate the second mode to generate radiation signals in the second frequency band.

In at least one embodiment, a frequency of the third frequency band is greater than a frequency of the second frequency band, meanwhile, the frequency of the second frequency band is greater than a frequency of the first frequency band. In detail, the first mode is an LTE low frequency operation mode and the first frequency band is a frequency band of about 699-960 MHz. The second mode is an LTE middle frequency operation mode and the second frequency band is a frequency band of about 1710-2170 MHz. The third mode is an LTE high frequency operation mode and the third frequency band is a frequency band of about 2490-2690 MHz.

Figure 2:
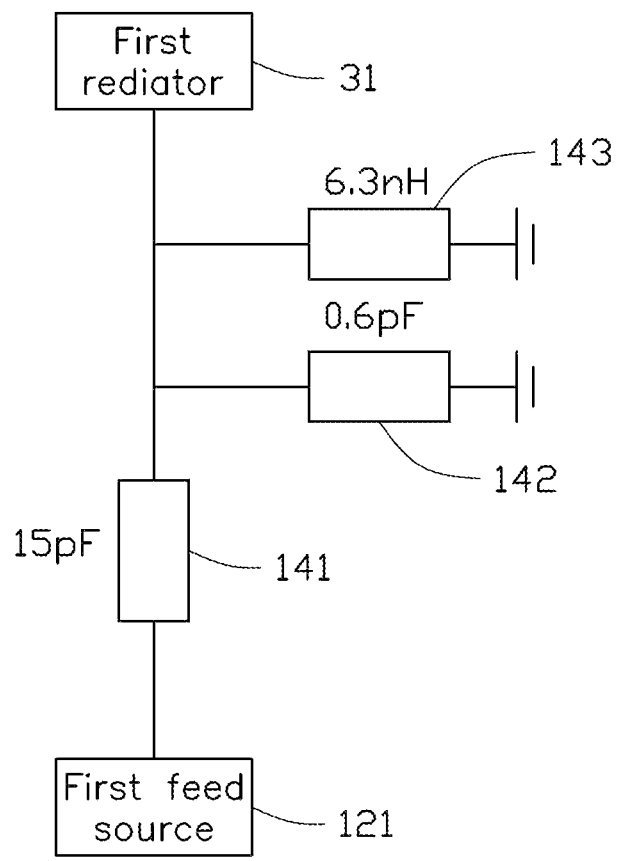
FIG. 2 is a circuit diagram of a first matching circuit of the antenna structure of FIG. 1.

FIG. 2 shows, in at least one embodiment, that the first matching circuit 14 is configured to impedance-match the radiation frequency band of the antenna structure 100. The first matching circuit 14 includes a first matching element 141, a second matching element 142, and a third matching element 143. One end of the first matching element 141 is electrically connected to the first feed source 121, the other end of the first matching element 141 is electrically connected to an end of the second matching element 142, an end of the third matching element 143, and the first radiator 31. The other end of the second matching element 142 and the other end of the third matching element 143 are grounded.

In at least one embodiment, the first matching element 141 can be a capacitor, the second matching element 142 can be a capacitor, and the third matching element 143 can be an inductor. A capacitance of the first matching element 141 can be about 1.5 pF, a capacitance of the second matching element 142 can be about 0.6 pF, and an inductance of the third matching element 143 can be about 6.3 nH. In other embodiments, the first matching element 141, the second matching element 142, and the third matching element 143 are not limited to the abovementioned capacitors and inductors, but can be other matching elements or their combination.

The second feed source 122 is electrically connected to the second radiator 32 through the second matching circuit 15. The second feed source 122 can feed current to the second radiator 32 and activates the second radiator 32 in a fourth mode and a fifth mode to respectively generate radiation signals in a fourth frequency band and/or a fifth frequency band. In at least one embodiment, a part of the current may flow along the second radiator 32 and be coupled to the first radiator 31 through the slot 175, thus, the second feed source 122, the first radiator 31, and the second radiator 32 form a coupling feed antenna and activate and adjust the third mode of the first radiator 31.

In at least one embodiment, a frequency of the fourth frequency band is lower than the frequency of the third frequency band, meanwhile, the frequency of the fourth frequency band is greater than a frequency of the second frequency band. In detail, the fourth mode is a high frequency operation mode and the fourth frequency band is a frequency band of about 1400-1500 MHz. The fifth mode is a GPS operation mode and the fifth frequency band is a frequency band of about 1575.42 MHz.

Figure 3:
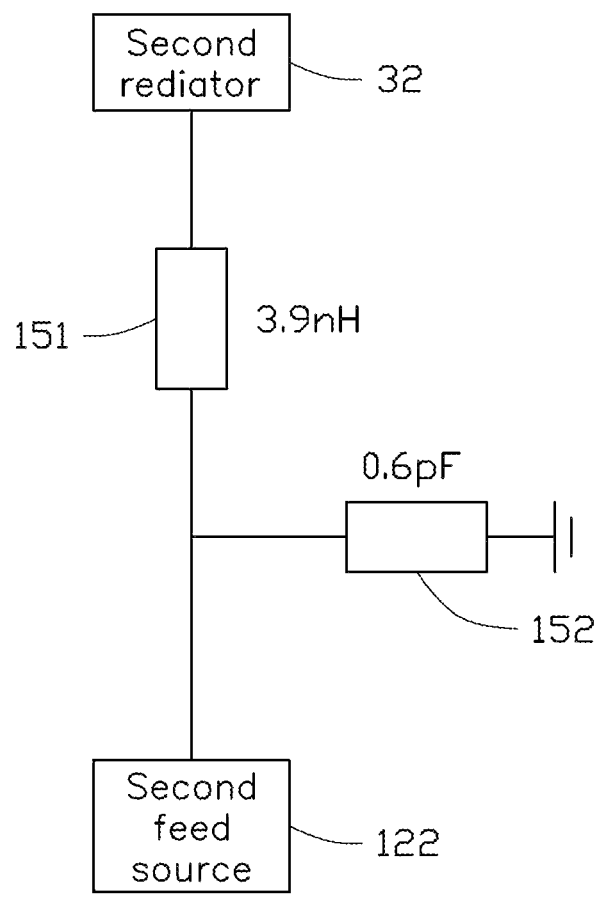
FIG. 3 is a circuit diagram of a second matching circuit of the antenna structure of FIG. 1.

As FIG. 3 shows, in at least one embodiment, the fourth matching element 151 can be an inductor and the fifth matching element 152 can be a capacitor. An inductance of the fourth matching element 151 can be about 3.9 nH and a capacitance of the fifth matching element 152 can be about 3.6 pF. In other embodiments, the fourth matching element 151 and the fifth matching element 152 are not limited to the abovementioned capacitors and inductors, but can be other matching elements or their combination.

Referring to FIG. 1, the antenna structure 100 includes the switching circuit 16, which is configured to adjust the operation mode of the first radiator 31. One end of the switching circuit 16 is electrically connected to a first ground portion 311, the other end of the switching circuit 16 is grounded. In at least one embodiment, the switching circuit 16 includes a switcher and at least one reactance element.

Figure 4:
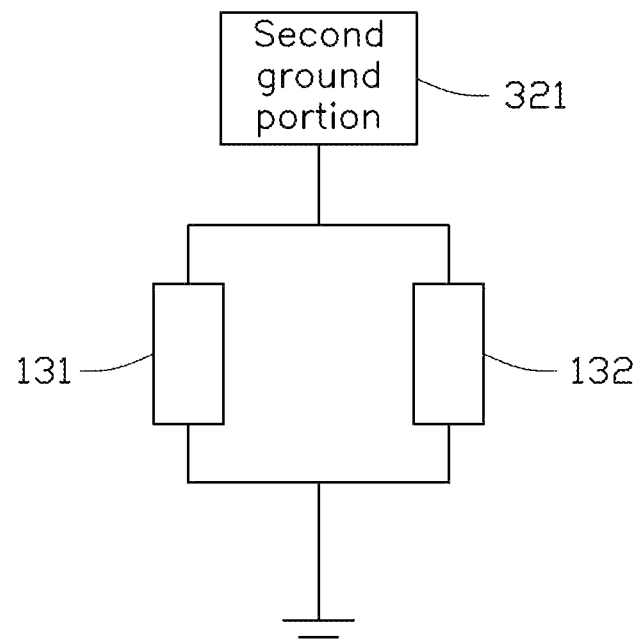
FIG. 4 is a circuit diagram of a resonance circuit of the antenna structure of FIG. 1.

Referring to FIG. 1 and FIG. 4, the antenna structure 100 includes the resonance circuit 13, which is received in the receiving space 19 and located between the base board 20 and the second radiator 32. In other embodiments, the particular position or location of the resonance circuit 13 is not restricted.

The resonance circuit 13, according to the second radiator 32, can precisely adjust the high frequency of the first radiator 31. The resonance circuit 13 includes a first resonance element 131 and a second resonance element 132. One end of the first resonance element 131 is electrically connected to an end of the second resonance element 132 and a second ground portion 321. The other end of the first resonance element 131 is electrically connected to the other end of the second resonance element 132 and ground.

In at least one embodiment, the first resonance element 131 can be an inductor and the second resonance element 132 can be a capacitor. In other embodiments, the first resonance element 131 can be a capacitor and the second resonance element 132 can be an inductor.

In at least one embodiment, calculating a resonance frequency of the resonance circuit 13 and setting the resonance frequency of the resonance circuit 13 to the third frequency band (2490-2690 MHz), and then by adjusting the capacitance of the resonance circuit 13 to adjust the resonance frequency of the resonance circuit 13, thus to adjust the operation frequency band of the second radiator 32 and affect the end portion of the second radiator 32. The second radiator 32 and the first radiator 31 are coupled, then by adjusting the capacitance of the resonance circuit 13, an operating frequency band of the LTE high frequency mode can be offset towards a lower frequency or towards a higher frequency (relative to each other). The fourth frequency band of 2490-2690 MHz of the first radiator 31 can be adjusted to achieve reception and transmission in the high frequency band of 2490-2690 MHz.

Figure 5:
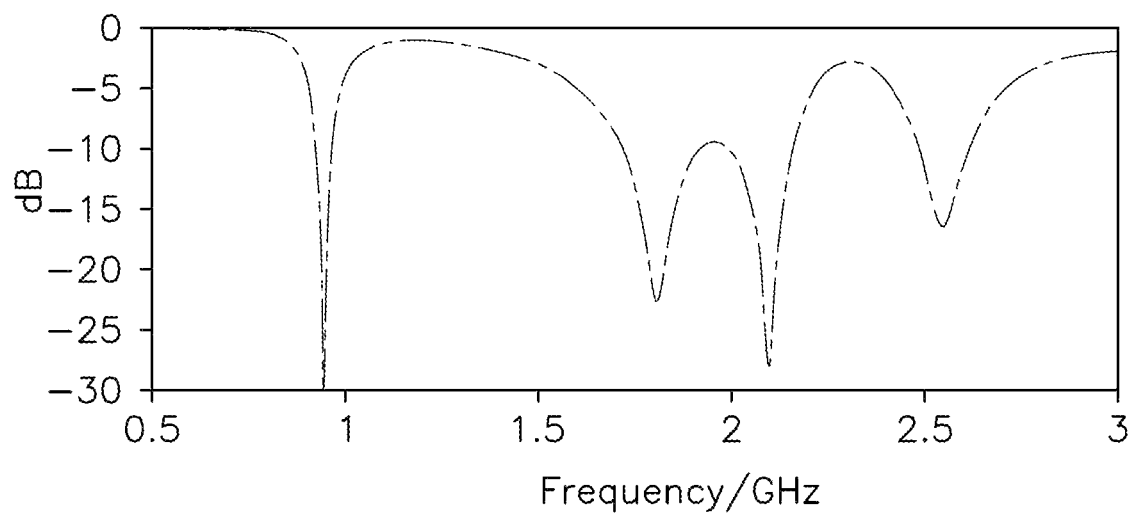
FIG. 5 is a scattering parameter graph of the antenna structure of FIG. 1.
Figure 6:
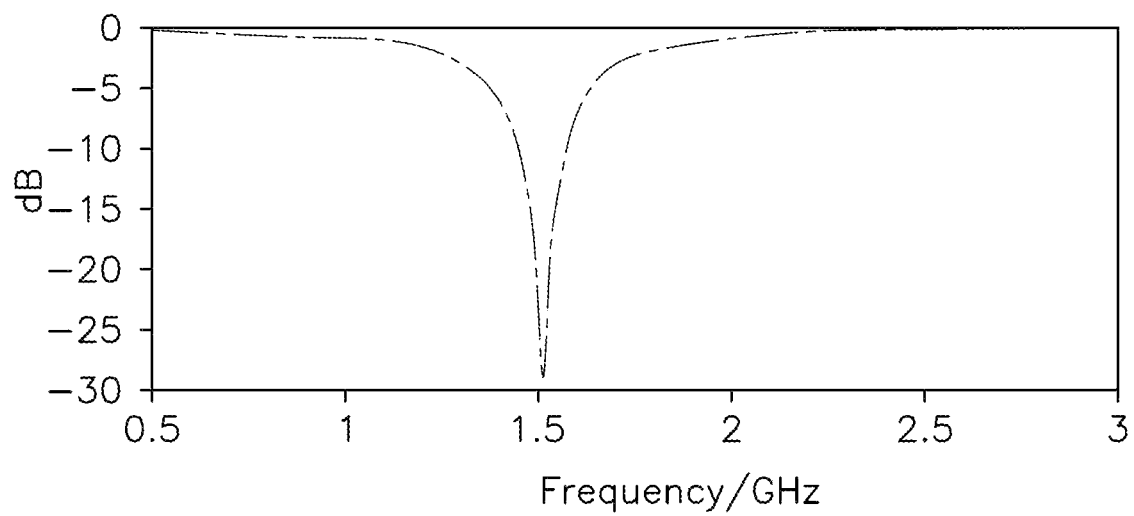
FIG. 6 is another scattering parameter graph of the antenna structure of FIG. 1.

FIG. 5 illustrates a scattering parameter graph of the antenna structure 100. When the first feed source 121 feeds current into the first radiator 21 and the current flows along the first radiator 21, the scattering parameter graph of the antenna structure 100 can be shown as FIG. 5. FIG. 6 illustrates another scattering parameter graph of the antenna structure 100. When the second feed source 122 is feeding current into the second radiator 32 and the current flows along the second radiator 32, the scattering parameter graph of the antenna structure 100 can be shown as FIG. 6.

Figure 7:
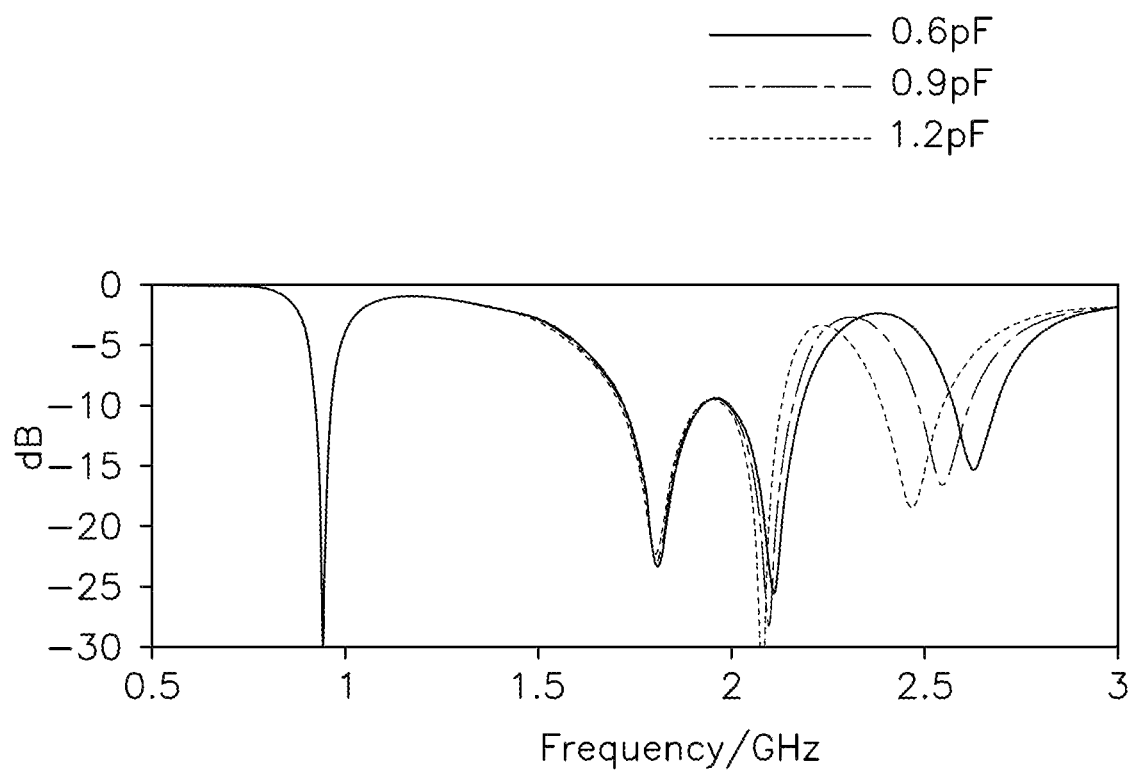
FIG. 7 is another scattering parameter graph of the antenna structure of FIG. 1.
Figure 8:
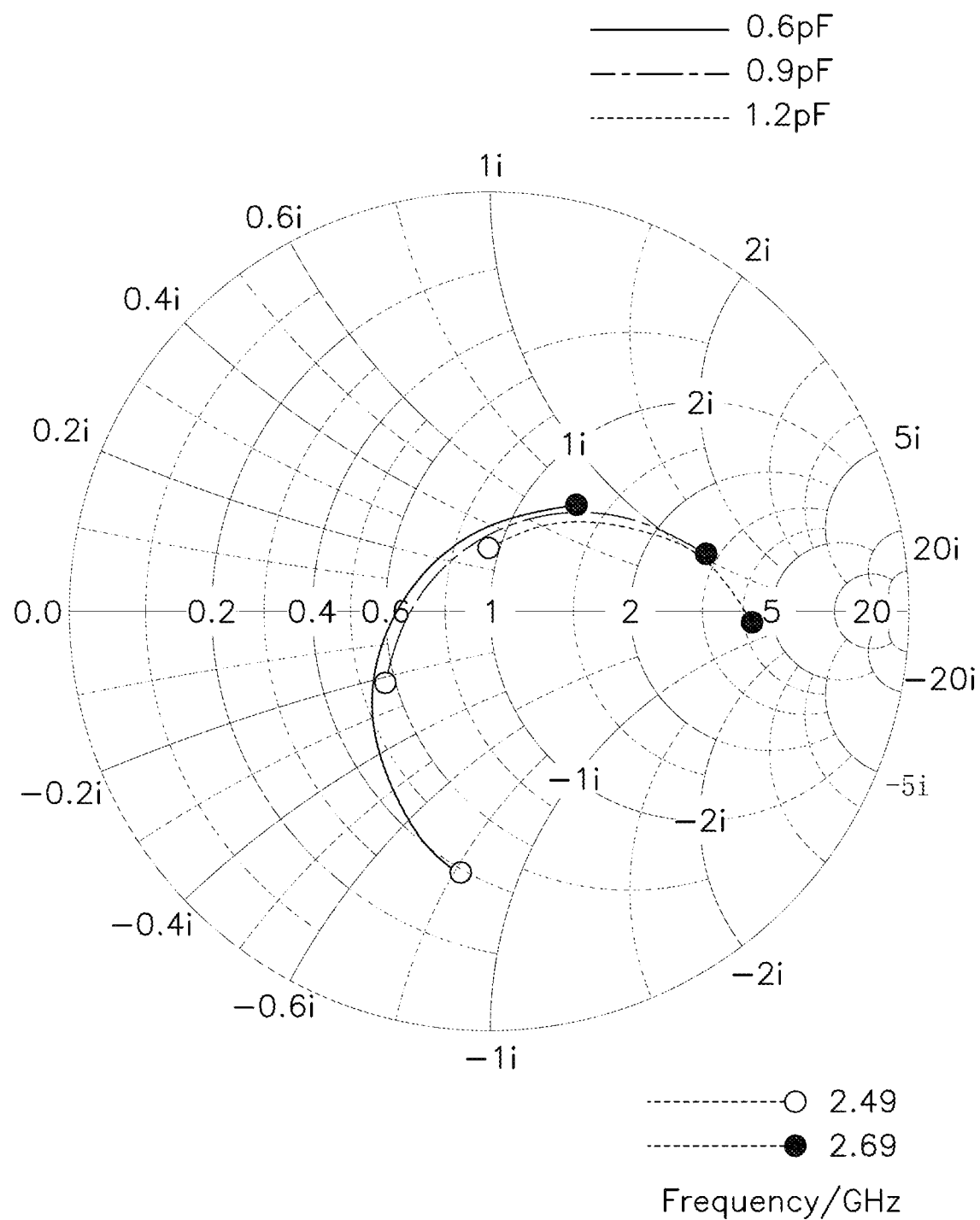
FIG. 8 is an admittance chart of the antenna structure of FIG. 1.

FIG. 7 illustrates another scattering parameter graph of the antenna structure 100. Adjusting the capacitance of the resonance circuit 13, the scattering parameter graph of the antenna structure 100 can be shown as FIG. 7. FIG. 8 illustrates an admittance chart (Smith chart) of the antenna structure 100. Adjusting the capacitance of the resonance circuit 13, the admittance chart of the antenna structure 100 can be shown as FIG. 8. Per FIG. 7 and FIG. 8, the capacitance of the resonance circuit 13 can be adjusted as about 0.6 pF, 0.9 pF, and 1.2 pF.

Figure 9:
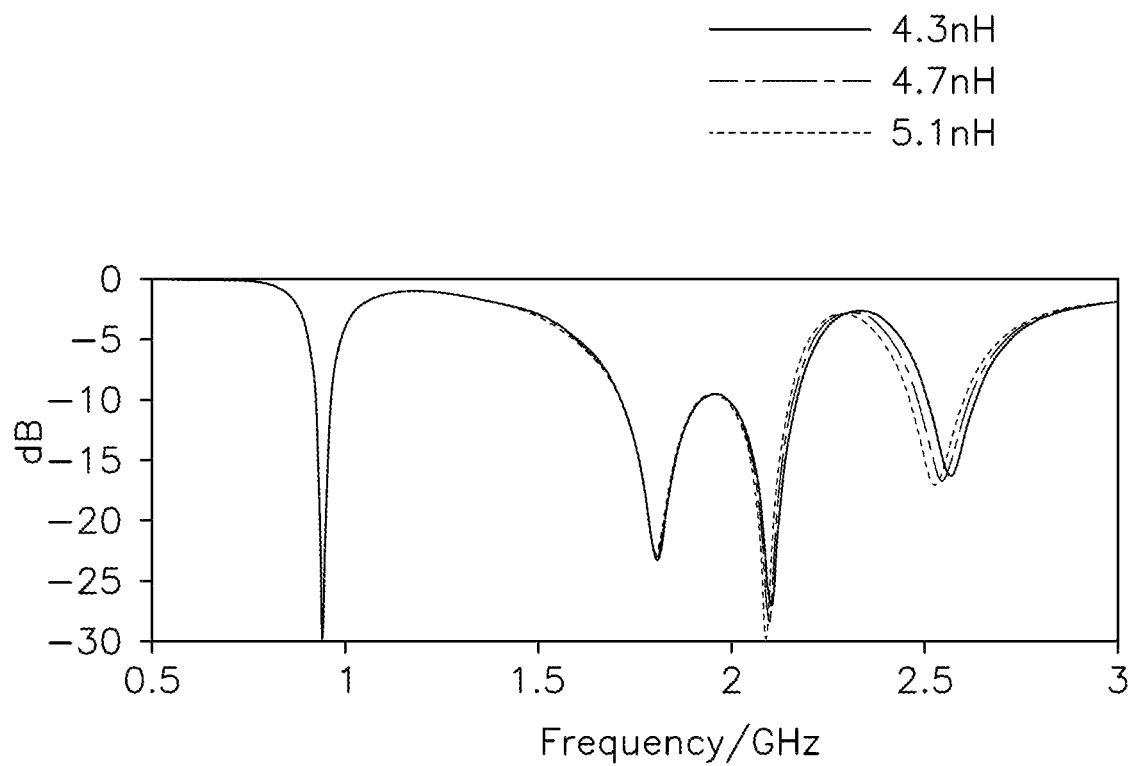
FIG. 9 is another scattering parameter graph of the antenna structure of FIG. 1.
Figure 10:
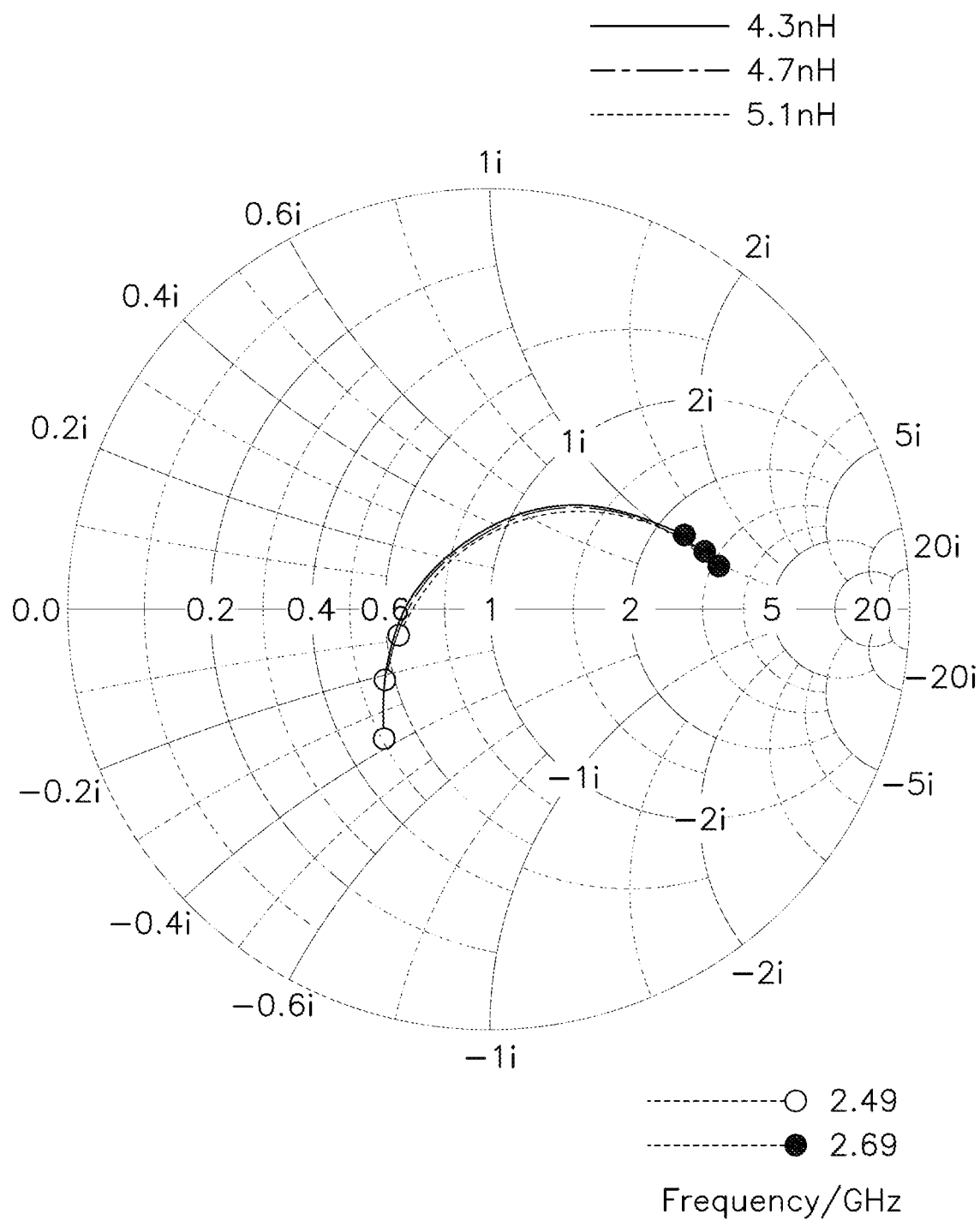
FIG. 10 is another admittance chart of the antenna structure of FIG. 1.

FIG. 9 illustrates another scattering parameter graph of the antenna structure 100. Adjusting the inductance of the resonance circuit 13, the scattering parameter graph of the antenna structure 100 can be shown as FIG. 9. FIG. 10 illustrates an admittance chart (Smith chart) of the antenna structure 100. Adjusting the inductance of the resonance circuit 13, the admittance chart of the antenna structure 100 can be shown as FIG. 10. Per FIG. 9 and FIG. 10, the inductance of the resonance circuit 13 can be adjusted as about 4.3 nH, 4.7 nH, and 5.1 nH.

Referring from FIG. 5 to FIG. 10, the antenna structure 100 can be operated at the LTE low frequency band, such as the frequency band of about 699-960 MHz, the LTE middle frequency band, such as the frequency band of about 1710-2170 MHz, and the LTE high frequency band, such as the frequency band of about 2490-2690 MHz. That is, the operating frequency bands of the antenna structure 100 cover all frequency bands for 4G LTE mobile phones. Additionally, the antenna structure 100 can also be operated in the 1.5 GHz frequency band (1400-1500 MHz) and the GPS frequency band (1575.42 MHz). The antenna structure 100 can operate over a wide range of frequencies, while satisfying design requirement of antennas and obtaining a good radiation efficiency.

The antenna structure 100 defines the gap 174 and the slot 175 to divide the side frame 17 into the first radiator 31, the second radiator 32, and the coupling portion 33. The antenna structure 100 further includes the first feed source 121 and the second feed source 122, the first feed source 121 feeds current into the first radiator 31 and couples to the coupling portion 33 to activate the first mode, the second mode, and the third mode, respectively generating radiation signals in the low frequency band, the middle frequency band, and the high frequency band. The second feed source 122 feeds current into the second radiator 32 to activate the fourth mode to generate radiation signals in the fourth frequency band.

Additionally, the first radiator 31 is a full frequency antenna and the second radiator 32 is a single frequency antenna, by adjusting the resonance frequency of the resonance circuit 13 electrically connected to the second radiator 32 and setting the resonance frequency of the resonance circuit 13 to the high frequency band, the operating frequencies of the second radiator 32 are affected. The second radiator 32 couples to the first radiator 31 adjusting the offset of the high frequency mode of the first radiator 31, and effectively adjusting the high frequency band (2490-2690 MHz) mode.

The gap 174 and the slot 175 are defined on the side frame 17 and not the back board 18 of the antenna structure 100, thus, the antenna structure 100 can work at the low frequency band, the middle frequency band, and the high frequency band merely utilizing the side frame 17, the back board 18 being made of non-metal material. Therefore, the wireless communication device 200 has a uniform appearance and be applied to limited clearance area for the antenna structure 100, meanwhile, maintaining very stable reception and transmission of wireless signals.

The embodiments shown and described above are only examples. Many details are often found in the art such as the other features of the antenna structure and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims.

It will therefore be appreciated that the embodiments described above may be modified within the scope of the claims.

What is claimed is:

1. An antenna structure comprising:
a housing, the housing comprising a first radiator and a second radiator; wherein the first radiator and the second radiator are spaced to each other and grounded;
a first feed source, one end of the first feed source electrically connected to the first radiator and configured to feed current into the first radiator, the first feed source feeding current into the first radiator to activate a first mode, a second mode, and a third mode to generate radiation signals in a first frequency band, a second frequency band, and a third frequency band;
a second feed source, one end of the second feed source electrically connected to the second radiator and configured to feed current into the second radiator, the second feed source feeding current into the second radiator to activate a fourth mode to generate radiation signals in a fourth frequency band; and
a resonance circuit, the resonance circuit being apart from the second radiator, the resonance circuit configured to adjust a radiation frequency band of the second radiator according to an impedance of the resonance circuit;
wherein the second radiator and the first radiator are coupled, the third frequency band of the third mode of the first radiator is adjusted according to the radiation frequency band of the second radiator adjusted by the resonance circuit;
wherein the first radiator comprises a first ground portion configured to be grounded, the second radiator comprises a second ground portion, one end of the resonance circuit is electrically connected to the second ground portion, the other end of the resonance circuit is grounded.

2. The antenna structure of claim 1, wherein the housing further comprises a coupling portion, the coupling portion is spaced from the first radiator, the first feed source feeds in the current into the first radiator, the first radiator conducts the current and couples the current to the coupling portion.

3. The antenna structure of claim 2, wherein the housing further comprises a side frame, the side frame defines a gap and a slot, the gap and the slot are communicated and extended across the side frame, a portion of the side frame between the gap and the slot forms the first radiator, a portion of the side frame adjacent to the gap and opposite to the first radiator forms the second radiator, and a portion of the side frame adjacent to the slot and opposite to the first radiator forms the coupling portion.

4. The antenna structure of claim 3, wherein the housing further comprises a backboard, the side frame surrounds edges of the backboard.

5. The antenna structure of claim 1, further comprising a first matching circuit, wherein the first matching circuit comprises a first matching element, a second matching element, and a third matching element;
wherein one end of the first matching element is electrically connected to the first feed source, the other end of the first matching element is electrically connected to one end of the second matching element, one end of the third matching element, and the first radiator, the other end of the second matching element is grounded, the other end of the third matching element is grounded; and
wherein the first matching circuit is configured to impedance matching radiation frequency bands of the antenna structure.

6. The antenna structure of claim 1, further comprising a second matching circuit, wherein the second matching circuit comprises a fourth matching element and a fifth matching element;
wherein one end of the fourth matching element is electrically connected to the second radiator, the other end of the fourth matching element is electrically connected to one end of the second feed source and the fifth matching element, the other end of the fifth matching element is grounded; and
wherein the second matching circuit is configured to impedance matching radiation frequency bands of the antenna structure.

7. The antenna structure of claim 1, further comprising a switching circuit, wherein one end of the switching circuit is electrically connected to the first ground portion, the other end of the switching circuit is grounded.

8. The antenna structure of claim 1 wherein the resonance circuit comprises a first resonance element and a second resonance element, one end of the first resonance element is electrically connected to one end of the second resonance element and the second ground portion, the other end of the first resonance element is electrically connected to the other end of the second resonance element and grounded.

9. The antenna structure of claim 1, wherein a frequency of the third frequency band is greater than a frequency of the second frequency band, the frequency of the second frequency band is greater than a frequency of the first frequency band, a frequency of the fourth frequency band is lower than the frequency of the third frequency band, the frequency of the fourth frequency band is greater than a frequency of the second frequency band.

10. A wireless communication device comprising:
an antenna structure, the antenna structure comprising:
a housing, the housing comprising a first radiator and a second radiator; wherein the first radiator and the second radiator are spaced to each other and grounded;
a first feed source, one end of the first feed source electrically connected to the first radiator and configured to feed current into the first radiator, the first feed source feeding current into the first radiator to activate a first mode, a second mode, and a third mode to generate radiation signals in a first frequency band, a second frequency band, and a third frequency band;
a second feed source, one end of the second feed source electrically connected to the second radiator and configured to feed current into the second radiator, the second feed source feeding current into the second radiator to activate a fourth mode to generate radiation signals in a fourth frequency band; and
a resonance circuit, the resonance circuit being apart from the second radiator, the resonance circuit configured to adjust a radiation frequency band of the second radiator according to an impedance of the resonance circuit;
wherein the second radiator and the first radiator are coupled, the third frequency band of the third mode of the first radiator is adjusted the third mode according to the radiation frequency band of the second radiator adjusted by the resonance circuit;
wherein the first radiator comprises a first ground portion configured to be grounded, the second radiator comprises a second ground portion, one end of the resonance circuit is electrically connected to the second ground portion, the other end of the resonance circuit is grounded.

11. The wireless communication device of claim 10, wherein the housing further comprises a coupling portion, the coupling portion is spaced from the first radiator, the first feed source feeds in the current into the first radiator, the first radiator conducts the current and couples the current to the coupling portion.

12. The wireless communication device of claim 11, wherein the housing further comprises a side frame, the side frame defines a gap and a slot, the gap and the slot are communicated and extended across the side frame, a portion of the side frame between the gap and the slot forms the first radiator, a portion of the side frame adjacent to the gap and opposite to the first radiator forms the second radiator, and a portion of the side frame adjacent to the slot and opposite to the first radiator forms the coupling portion.

13. The wireless communication device of claim 12, wherein the housing further comprises a backboard, the side frame surrounds edges of the backboard.

14. The wireless communication device of claim 10, wherein the antenna structure further comprises a first matching circuit, wherein the first matching circuit comprises a first matching element, a second matching element, and a third matching element;
wherein one end of the first matching element is electrically connected to the first feed source, the other end of the first matching element is electrically connected to one end of the second matching element, one end of the third matching element, and the first radiator, the other end of the second matching element is grounded, the other end of the third matching element is grounded; and
wherein the first matching circuit is configured to impedance matching radiation frequency bands of the antenna structure.

15. The wireless communication device of claim 10, wherein the antenna structure further comprises a second matching circuit, wherein the second matching circuit comprises a fourth matching element and a fifth matching element;
wherein one end of the fourth matching element is electrically connected to the second radiator, the other end of the fourth matching element is electrically connected to one end of the second feed source and the fifth matching element, the other end of the fifth matching element is grounded; and
wherein the second matching circuit is configured to impedance matching radiation frequency bands of the antenna structure.

16. The wireless communication device of claim 10, wherein the antenna structure further comprises a switching circuit, one end of the switching circuit is electrically connected to the first ground portion, the other end of the switching circuit is grounded.

17. The wireless communication device of claim 10, wherein the resonance circuit comprises a first resonance element and a second resonance element, one end of the first resonance element is electrically connected to one end of the second resonance element and the second ground portion, the other end of the first resonance element is electrically connected to the other end of the second resonance element and grounded.

18. The wireless communication device of claim 10, wherein a frequency of the third frequency band is greater than a frequency of the second frequency band, the frequency of the second frequency band is greater than a frequency of the first frequency band, a frequency of the fourth frequency band is lower than the frequency of the third frequency band, the frequency of the fourth frequency band is greater than a frequency of the second frequency band.

* * * * *